United States Patent
do Amaral Assy et al.

(10) Patent No.: US 10,820,481 B2
(45) Date of Patent: Nov. 3, 2020

(54) SEED SELECTOR ASSEMBLIES FOR PNEUMATIC METERS

(71) Applicant: Jose Roberto do Amaral Assy, Município de Caldas Novas (BR)

(72) Inventors: Jose Roberto do Amaral Assy, Município de Caldas Novas (BR); Tiago Lauletta Modesto, Sao Paulo (BR); Enrico Incao, São Paulo (BR)

(73) Assignee: Jose Roberto do Amaral Assy, Caldas Novas, GO (BR)

( * ) Notice: Subject to any disclaimer, the term of this patent is extended or adjusted under 35 U.S.C. 154(b) by 39 days.

(21) Appl. No.: 15/492,308

(22) Filed: Apr. 20, 2017

(65) Prior Publication Data

US 2017/0303463 A1 Oct. 26, 2017

(30) Foreign Application Priority Data

Apr. 20, 2016 (BR) .......................... 1020160089450

(51) Int. Cl.
*A01C 7/04* (2006.01)
*A01C 7/12* (2006.01)
*A01C 19/02* (2006.01)

(52) U.S. Cl.
CPC ............... *A01C 7/046* (2013.01); *A01C 7/04* (2013.01); *A01C 7/128* (2013.01); *A01C 19/02* (2013.01)

(58) Field of Classification Search
CPC ........... A01C 7/046; A01C 7/102; A01C 7/04
See application file for complete search history.

(56) References Cited

U.S. PATENT DOCUMENTS

| 3,888,387 A | 6/1975 | Deckler |
| 4,009,668 A | 3/1977 | Brass |
| 4,029,235 A * | 6/1977 | Grataloup ............... A01C 7/046 221/211 |
| 4,594,951 A | 6/1986 | Grataloup |
| 4,836,412 A * | 6/1989 | Webber .................. A01C 7/046 221/211 |
| 5,170,909 A | 12/1992 | Lundie et al. |
| 6,109,193 A * | 8/2000 | Crabb .................... A01C 7/046 111/185 |
| 6,718,892 B1 * | 4/2004 | Rosenboom ........... A01C 7/046 111/185 |

(Continued)

FOREIGN PATENT DOCUMENTS

| BR | PI0904828 A2 | 5/2013 |
| WO | 2016054715 A1 | 4/2016 |

*Primary Examiner* — Alicia Torres
(74) *Attorney, Agent, or Firm* — FisherBroyles, LLP

(57) ABSTRACT

A seed selector assembly for a pneumatic meter employed in agricultural seeding equipment may include a seed selector assembly connected to a multi-functional coupler, in which the seed selector assembly is made up of a rotating disk with a central hole and a gear profile, the disk being enclosed by a front ring and a rear ring, and the multi-functional coupler having two interfaces for connecting motor or driven devices. A pinion may be connected to an end of an axis, the opposite end of which is connected to a crown, the pinion being fitted into the cavity of the rear ring and the circular bore of the front ring, with a housed bearing support. The pinion may interact with the gear profile in order to rotate the disk when at least one of the interfaces is connected to a motor device.

19 Claims, 18 Drawing Sheets

(56) References Cited

U.S. PATENT DOCUMENTS

| | | | |
|---|---|---|---|
| 7,699,009 B2* | 4/2010 | Sauder | A01C 7/046 |
| | | | 111/185 |
| 7,798,080 B2 | 9/2010 | Sauder et al. | |
| 9,277,688 B2* | 3/2016 | Wilhelmi | A01C 19/02 |
| 2010/0224110 A1* | 9/2010 | Mariman | A01C 7/046 |
| | | | 111/11 |
| 2015/0305229 A1 | 10/2015 | Sauder | |
| 2016/0044859 A1 | 2/2016 | Do Amaral Assy et al. | |

* cited by examiner

SEED SELECTOR ASSEMBLIES FOR PNEUMATIC METERS

PRIORITY CLAIM

This application claims the benefit of the filing date of Brazilian Patent Application Serial No. BR 10 2016 08945-0, filed Apr. 20, 2016, for "Seed Selector Assembly With Multi-Functional Coupler for Pneumatic Meter," the disclosure of which is hereby incorporated herein in its entirety by this reference.

TECHNICAL FIELD

This disclosure generally proposes an improvement in a pneumatic-type seed metering system, which is used as an integral part of agricultural sowing equipment, also known as planter machines.

BACKGROUND

Various models of pneumatic or vacuum meters and planters have been developed and described in patents, and among these, in particular, is the classic "Vacuum Seed Meter," U.S. Pat. No. 5,170,909 from a well-known planter manufacturer. Another example of a successful vacuum meter is described in U.S. Pat. No. 3,888,387 to Deckler, the disclosure of each of which is hereby incorporated herein in its entirety by this reference.

Better singulation of the seeds and/or greater efficiency of the system as a whole is greatly sought after.

Conventional pneumatic seed metering equipment integrates agricultural implements specifically intended for sowing. Such agricultural equipment, known as pneumatic planters, including a seed vacuum meter (5), as shown in FIG. 1, which includes a seed input region, an internal rotary disk that contains orifices responsible for collecting and transporting seeds, a seed singulator made up of one or more objects that repeatedly touch the seeds, singulating those collected by disk's orifices, a debris ejector responsible for removing the debris that may be trapped in the disk's orifices, a sealed region that provides a pressure difference between the two sides of the seed collecting disk, and a region in which the seeds are released and sent out from the meter.

The term "seed singulation," as used herein, is meant to refer to the task of metering seeds one by one, without misses or double seeds.

The constructive arrangement of such elements in meters, such as that disclosed in U.S. Pat. No. 5,170,909, although effective, presents a great limitation; that is, the need to manually adjust the seed singulator for each type of crop and seed size to be dosed by the meter. This manual adjustment lets the singulator to be adjusted incorrectly, causing the quality of the seed singling-out process to be compromised.

The meter described in Patent Publication No. US2015/0305229 (incorporated by reference herein) does not feature manual adjustment in the singulator; however, one problem presented by this meter is that the exchange of the meter components is not very practical, as there is a need to change three different parts when the meter is being prepared to dose out a seed crop that is different from the previous crop. Among these pieces, there are small pieces, such as the debris ejector, that may be easily lost when exchanging seed crops.

Following is a simplified summary of embodiments described in this disclosure. This summary is not a general extensive vision of all the embodiments covered herein and is not meant to identify fundamental or critical elements or to delineate the scope of such embodiments. Its sole purpose is to present some concepts of the embodiments described in a simplified way, serving as an introduction to the more detailed description that will be hereinafter presented.

It is important to note that this disclosure, while focusing on pneumatic meters that utilize vacuum sources to dose out seeds, may receive an alternative constructive shape in which the pressure difference between the disk's two sides is obtained by raising the pressure on the disk side on which the seeds are transported.

BRIEF SUMMARY

Embodiments of this disclosure include a seed selector assembly with multi-functional coupler for a pneumatic meter that consists of a rotary disk with orifices encircled by a ring in which the protrusions that singularize seeds (or seed singulators) are located. The seed selector assembly also comprises a debris ejector, which is used as an integral part of agricultural equipment for sowing crops, also known as planter machines.

Embodiments of this disclosure also include multi-functional coupler capable of performing the interface between the seed selector assembly and a motor and/or driven device, which may be an electric motor, hydraulic motor, pneumatic motor, drive shaft or a flexible cable. The driven device can be a power generator for sensors/actuators or some other device that carries out some task with the seeds, such as applying graphite or chemical products.

In some embodiments, the seed singulator position does not need to be adjusted in order to obtain a high quality of seed singulation. This is due to the precision obtained when positioning the seed singulating protrusions relative to the disk's orifices, the penetration of these protrusions in the hole zone being gradual, and the working pressure difference between the two sides of the disk being higher than in most conventional meters. This peculiar combination may allow for superior performance with different seed sifters, even without adjusting the meter.

The cited positioning accuracy may be obtained due to the fact that the disk is trapped within the ring, and rotated by its being inserted into the ring's tracks, which contain the singulating protrusions, and these protrusions obliquely advance over the disk.

In some embodiments, this singulator positioning accuracy may be achieved without requiring the use of springs and other components.

Each protrusion may be flexible within the axial and radial axes, which allows them to act independently of one another, allowing their movement to avoid changing the position of other seed singulating protrusions if objects become trapped in the holes.

Some embodiments exhibit ease and practicality of preparing the meter for use with another crop, since it is sufficient to exchange the seed selector assembly with another that is specifically designed for the new crop.

The multi-functional coupler may allow the seed selector assembly disk to be traced by different sources, in addition to allowing the disk to be rotated in order to move/rotate other useful devices to be nearer the meter.

BRIEF DESCRIPTION OF THE DRAWINGS

Certain characteristics, nature, and advantages of this description will be more apparent from the detailed description below, when read in conjunction with the drawings, in which the same references refer to the same elements.

DETAILED DESCRIPTION

As shown in the accompanying drawings, this disclosure provides a seed selector assembly with multi-functional coupler for a pneumatic meter used in agricultural seeding equipment, which may eliminate the need for adjustment/regulation of the metering singulator's positioning and may facilitate its preparation for use with a new crop, allowing the disk interface of the seed selector assembly to be coupled with other devices.

Figure 1:
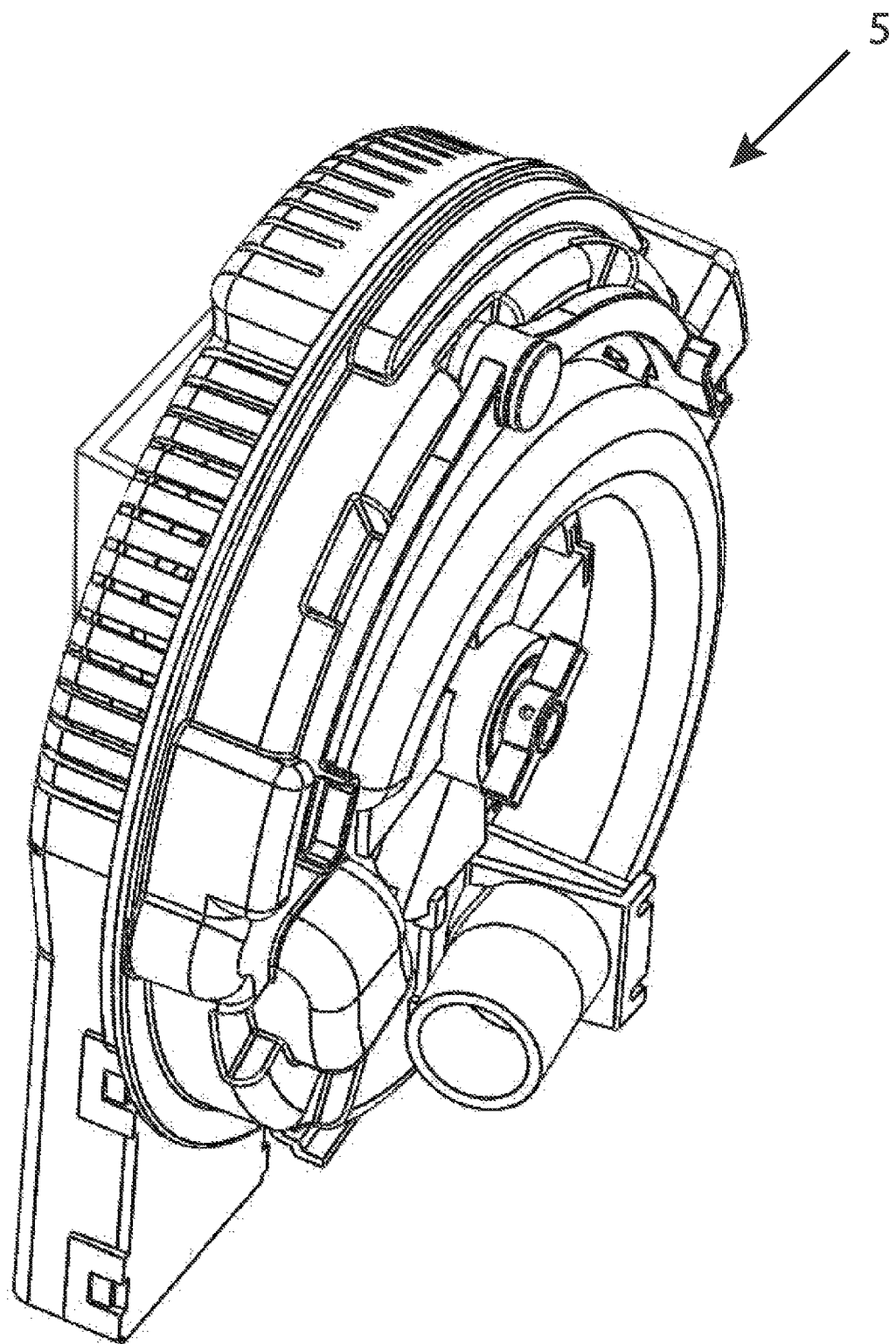
FIG. 1—Illustrates an example of a prior art vacuum seed meter.
Figure 2:
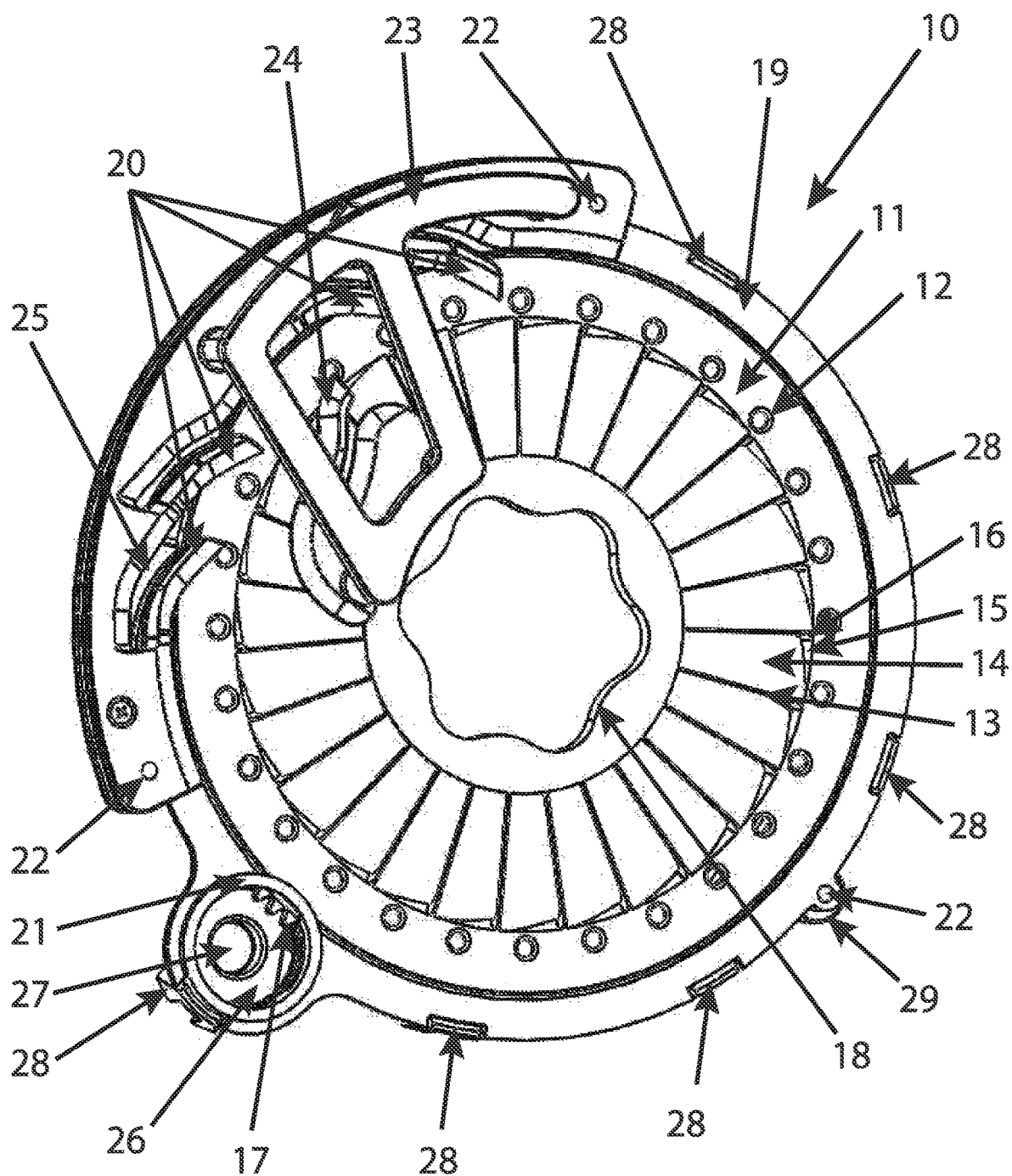
FIG. 2—Illustrates a front view of a seed selector assembly for a pneumatic meter, according to an embodiment of this disclosure.
Figure 3:
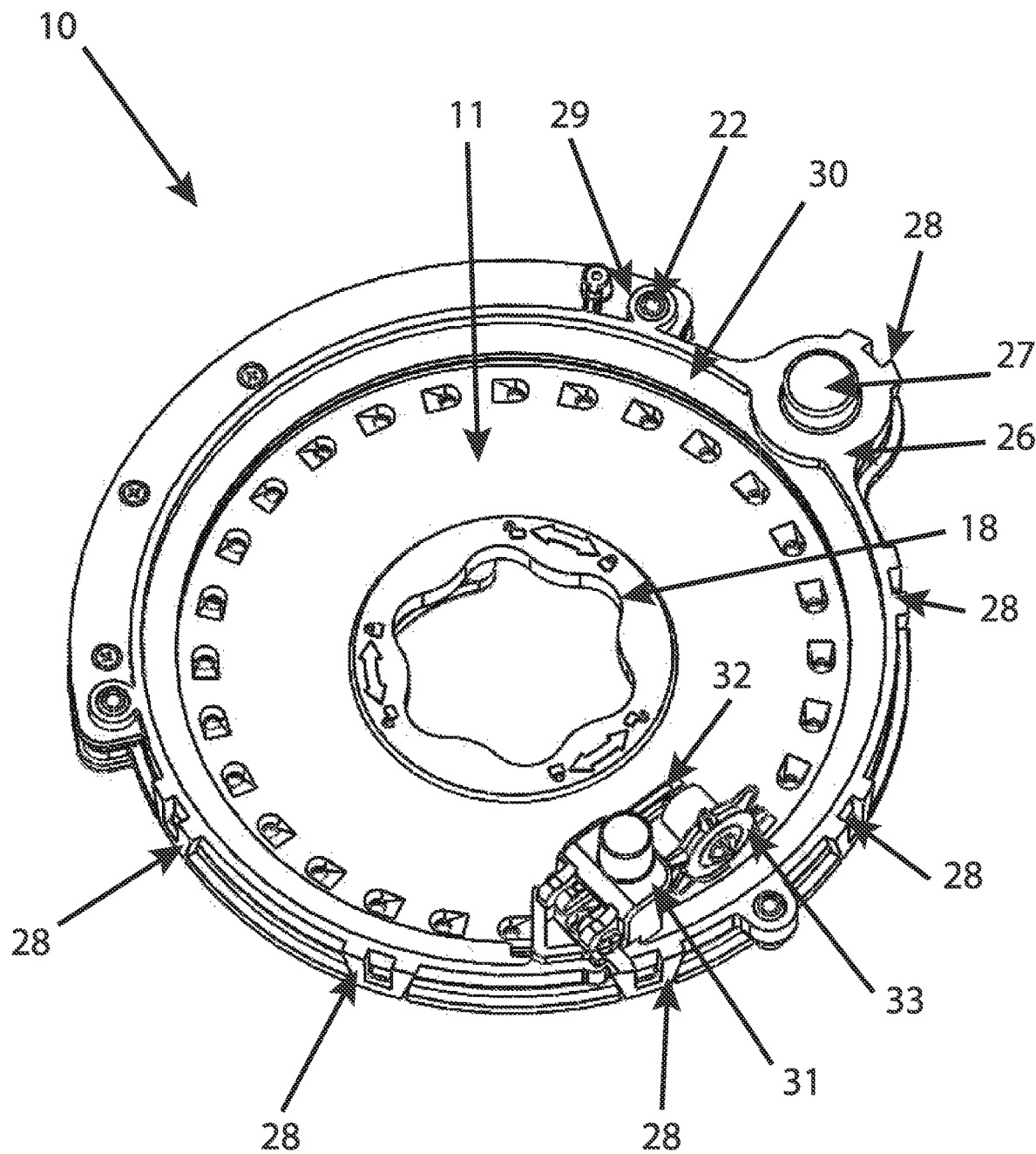
FIG. 3—Illustrates a rear view of the seed selector assembly for the pneumatic meter of FIG. 2.
Figure 4:
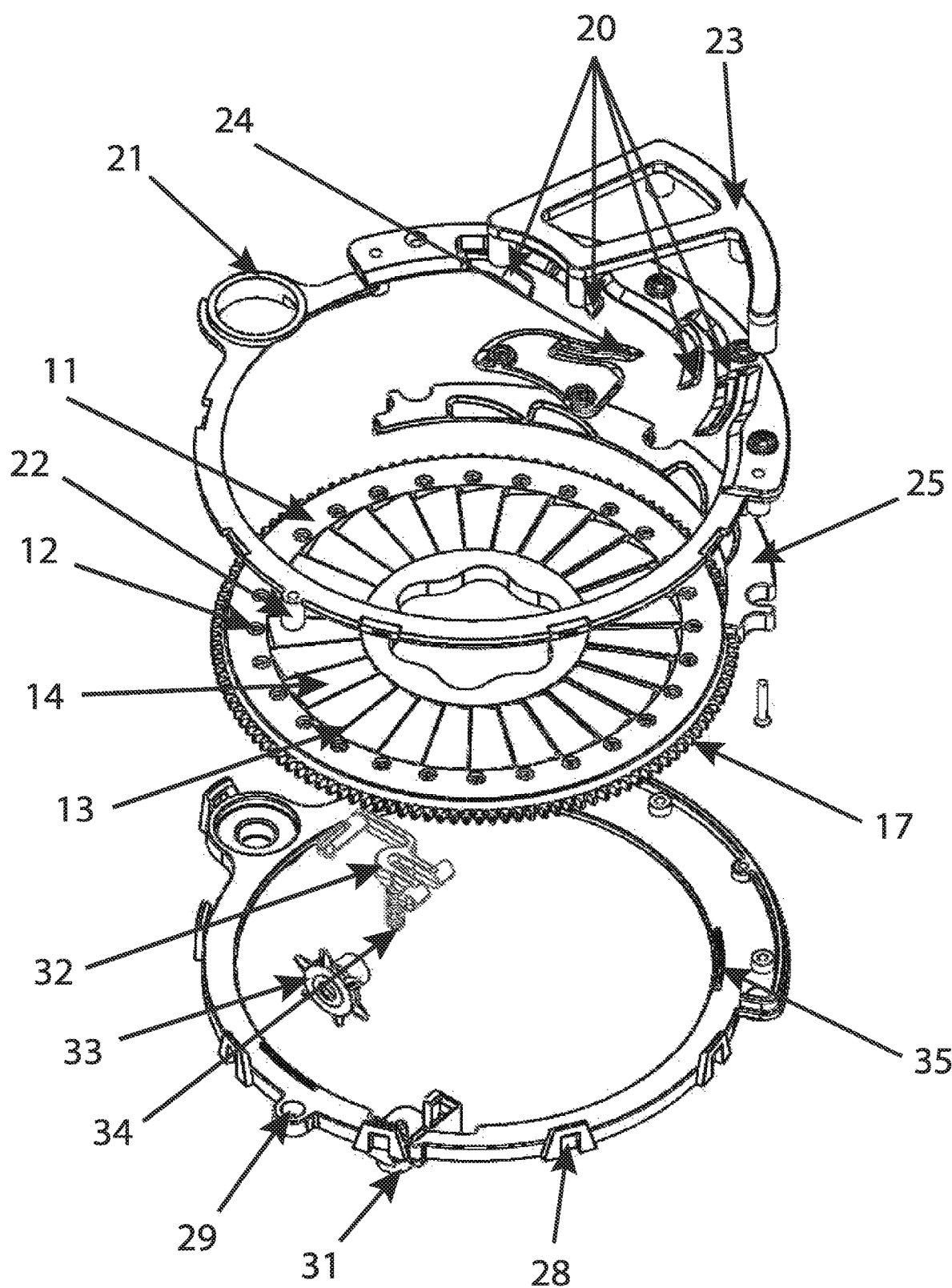
FIG. 4—Illustrates a zoomed-in partial view of the seed selector assembly for the pneumatic meter of FIG. 2.

With reference to FIGS. 2, 3 and 4, which illustrate a seed selector assembly (10) according to an embodiment of this disclosure, illustrated is a rotating disk (11) with gear profile (17), which rotates clockwise and collects seeds in the lower left part in holes (12), seeds passing through an upper singulation protrusions (20) and a lower singulation protrusion (24), which singularize seeds and release them from the right side. The disk (11) is surrounded by a ring, which in this embodiment has been divided into a front ring (19) and a back ring (30). Accuracy obtained by this assembly may enable the upper singulation protrusions (20), which are arranged in the front ring (19), and the lower protrusion (24), connected to the front ring (19) via a bridge (23), to obtain improved positioning accuracy relative to the disk holes (12), allowing for an excellent level of seed singulation to be obtained. Flaps (13) radially placed on the disk (11) may include a central stirrer and may have the function of stirring the seeds, helping to collect the seeds. A circular arc piece (25) fills the empty space between the two rings (19, 30) that surround the disk (11), preventing the seeds from becoming trapped in that region. A circular hole (21) in the front ring (19) and a cavity (26) in the rear ring (30) may allow coupling of a multi-functional coupler (39), which will be described later. The cavity (26) also has a space (27) for a bearing. The disk (11) can also be driven by its recess in the center (18) thereof. Also provided are clips (28) that are configured for closing the seed selector assembly, joining the front ring (19) to the rear ring (30), surrounding the disk (11), and guide pins (22) from the front ring fit into the guide holes (29) in order to ensure precise positioning between these two parts.

As best shown in FIGS. 3 and 4, a structure (31) in the rear ring (30) is configured for supporting a debris ejector, which is made up of a hinged arm (32), a guard spring (34) and a disk (33) that ejects debris.

Although the described embodiment of the disclosure has a constructive solution with a front ring (19) and a rear ring (30), it is possible to obtain an alternative constructive shape of the seed selector assembly with a single ring.

Depending on the crop to be planted, the geometry, size, number and quantity of disk orifice, singulator, and debris ejector rows may vary.

Figure 5:
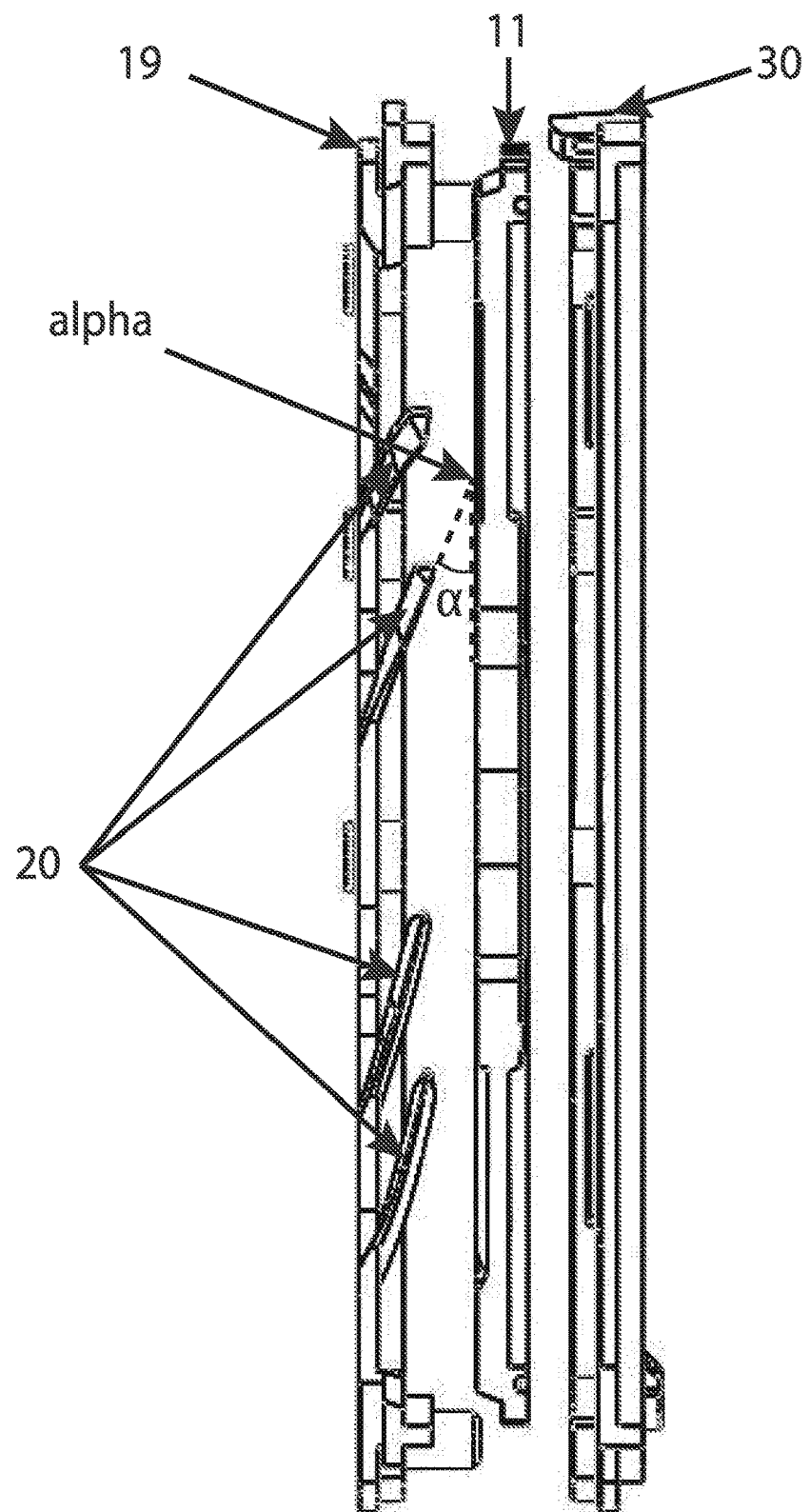
FIG. 5—Illustrates a angles of the singulation protrusions relative to the plane of the disk of the seed selector assembly for the pneumatic meter of FIG. 2.

With reference FIG. 5, the angles (alpha) of the singulation protrusions (20) relative to the plane of the disk (11) are illustrated, which angle may be applied to the flexible material singulation protrusions, allowing them to apply a preload on the disk, improving accuracy of positioning.

Each singulation protrusion (20) may be designed in such a way as to favor its structure being flexible both radially and axially of the disk.

In the event of a seed or debris getting trapped between the disk and the singulator, the protrusion will not break, suffer damage or cause the system to lock. To achieve this result, mass relief may be performed in the region of a base of the singulation protrusions (20). The lower protrusion (24), although not shown in FIG. 5, may have the same or similar constructive principles as the upper protrusions (20).

Figure 6:
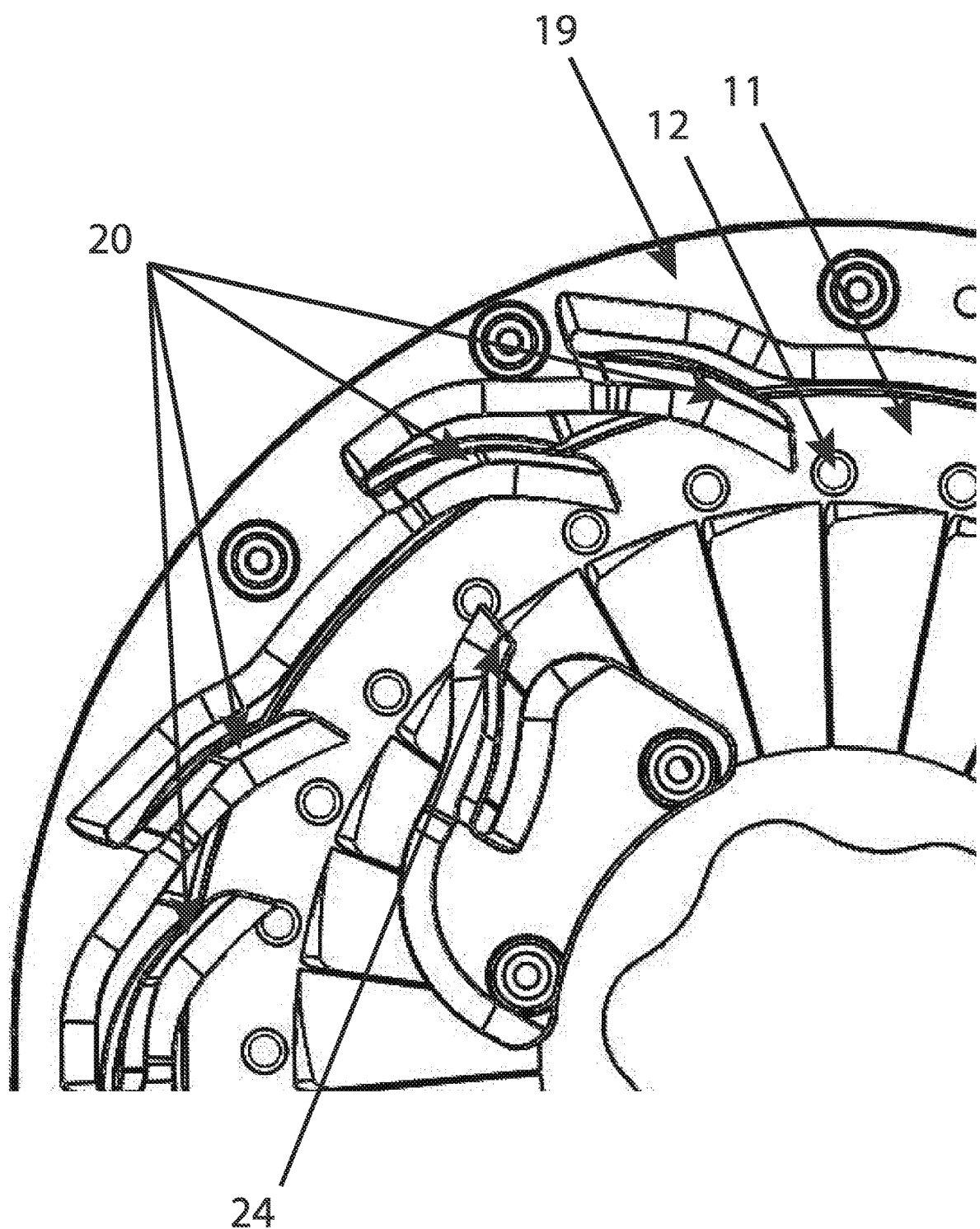
FIG. 6—Illustrates a detailed view of the peculiar positioning and fit of the singulation protrusions into the holes of the seed selector assembly for the pneumatic meter of FIG. 2.

With reference FIG. 6, which illustrates in detail the upper and lower singulation protrusions (20, 24) omitting the bridge (23) that connects them, the fit of each singulation protrusion (20, 24) relative to the holes (12) is distinctly illustrated and configured for reducing doubles. Each protrusion (20, 24) is designed in such a way that the interaction between them and the hole (12) (and the seed or seeds trapped there) is performed in a linear manner during the circular movement, that is, in accordance with the rotation of the disk (11), as the protrusion advances toward the hole (12), with a constant advance; that is, as the disk rotates, the protrusion will constantly penetrate, without changing the intensity of the advance. The upper singulation protrusion (20) pushes a constant amount of seed(s) toward the center of the disk with each angular movement of the disk (11), and the lower singulation protrusion (24) does the same, opposite the center of the disk (11). This allows seeds attached to the hole (12) to be pushed, so as to remove doubles or triples in a more efficient way than in the prior art, leaving only one seed per hole (12). Laboratory tests have indicated a reduction in doubles during the singulation of disk seeds by up to 30%, according to the seed batch and type used.

An example configuration, including four upper singulation protrusions (20) and one lower singulation protrusion (24), was obtained after exhaustive laboratory and field studies and considerably reduces the incidence of double seeds in the holes (12), when compared to the prior art configurations, since the fitting of the upper part, aided by gravity, makes for rougher singulation, and after two fits caused by the first two upper singulation protrusions (20), the lower protrusion (24) takes place "constantly," as shown above, gently pushing seeds up above the hole. The tendency of the seeds is to go downward, due to the action of the first two fits of the upper protrusions (20) and to gravity and, in this way, the last two singulating protrusions (20) make the final fits more effectively, performing the meticulous work of removing the remaining double seeds.

Figure 7:
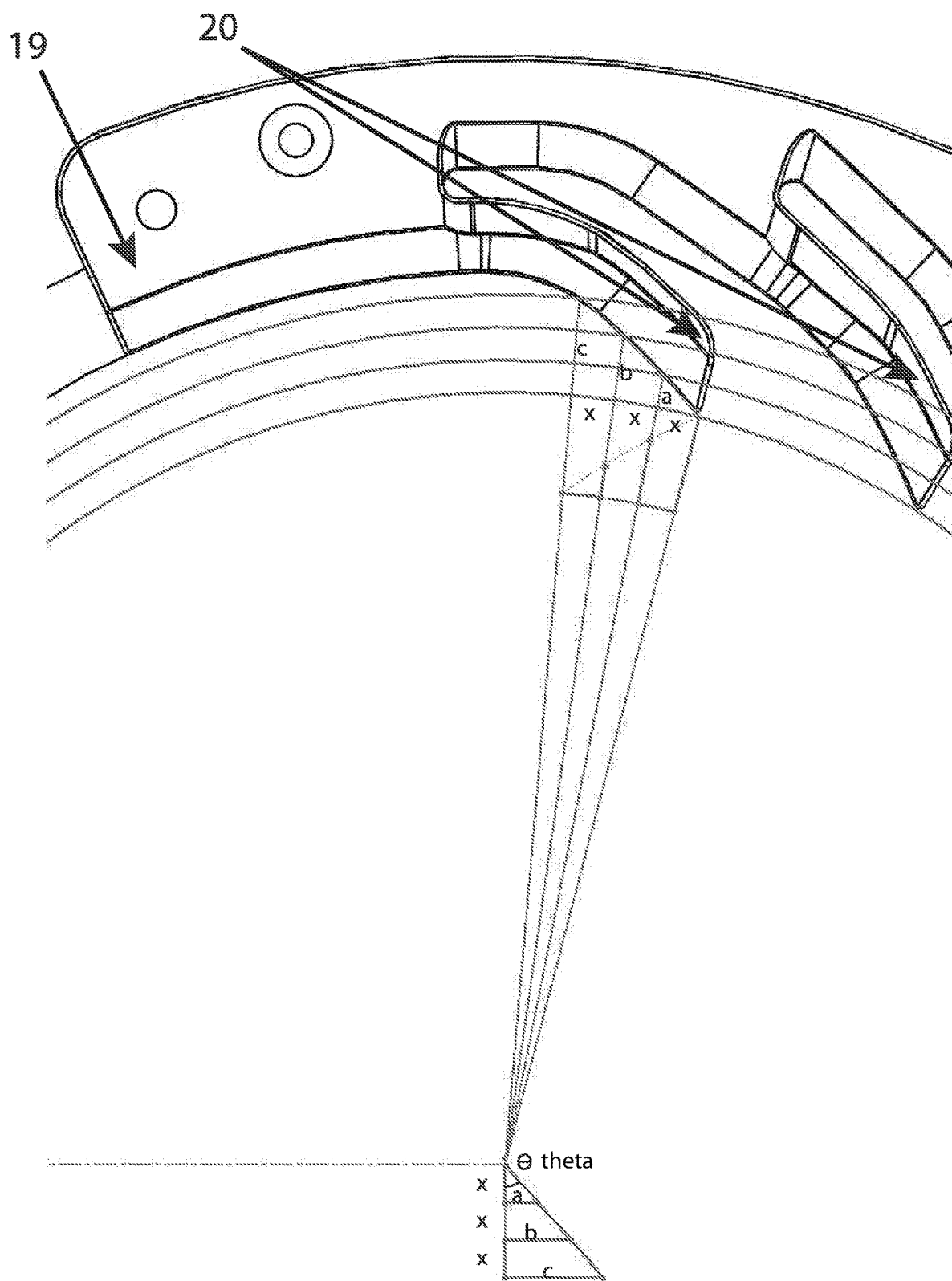
FIG. 7—Illustrates a gradual profile of the singulation protrusions from the disk of the seed selector assembly for the pneumatic meter of FIG. 2.

With reference FIG. 7, which represents the geometric form for obtaining the constant fitting profile of the singulation protrusions, it can be seen that it is possible to vary the angle (theta) so that the smaller it is, the less aggressive and the longer the fitting of the singulating protrusion (20) will be, and, consequently, the larger the angle is, the more aggressive and shorter the fitting of the singulating protrusion will be. Each protrusion (20) can be designed at a different angle to obtain the best possible singulation scenario for each seed crop.

Note that the triangle heights a, b and c, which are defined by equal distances x in the base, are carried to the curve of the protrusions in order to obtain the constant fitting.

Figure 8:
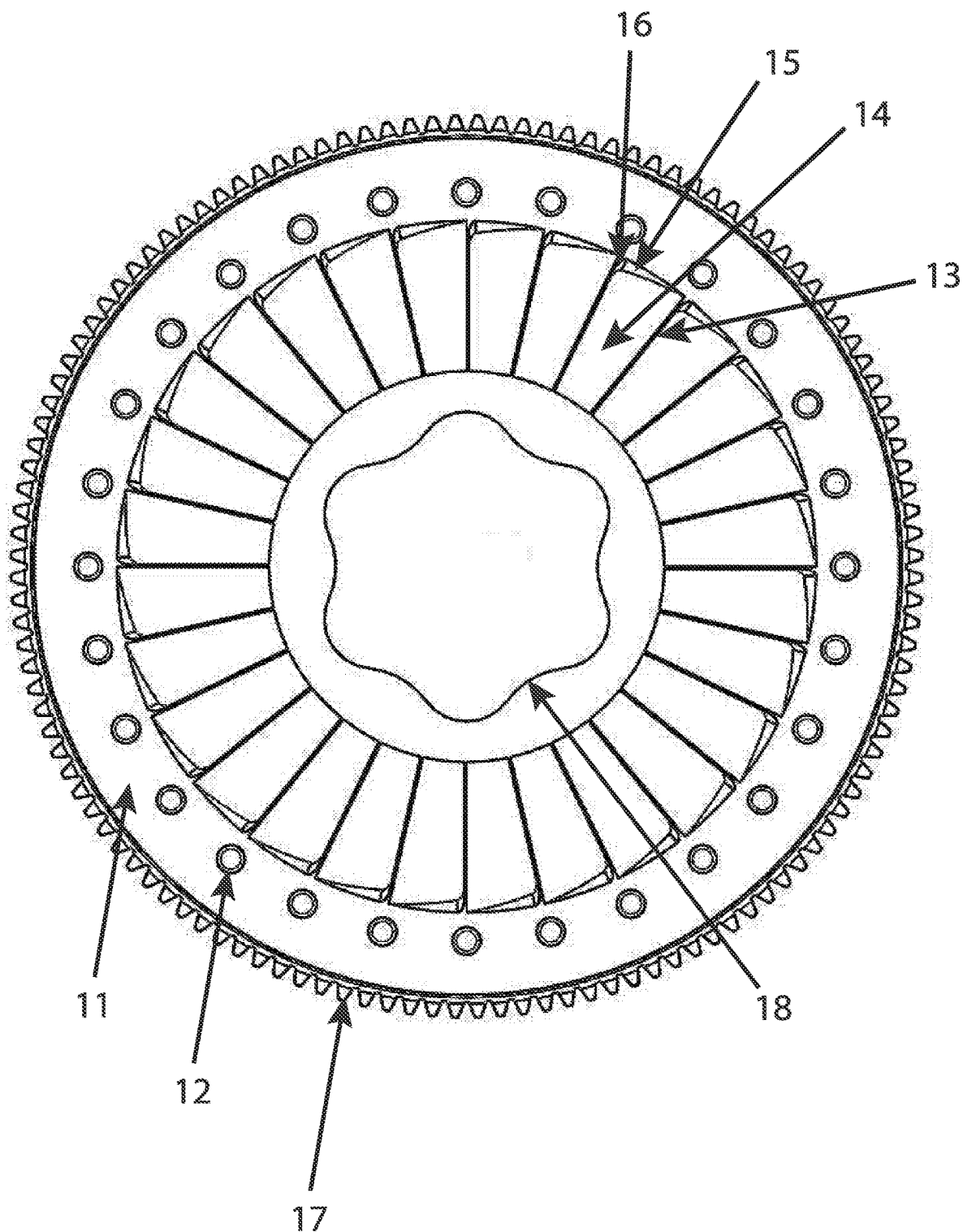
FIG. 8—Illustrates an embodiment of the perforated disk from the seed selector assembly of the pneumatic meter of FIG. 2, emphasizing the disk's central stirrer.
Figure 9:
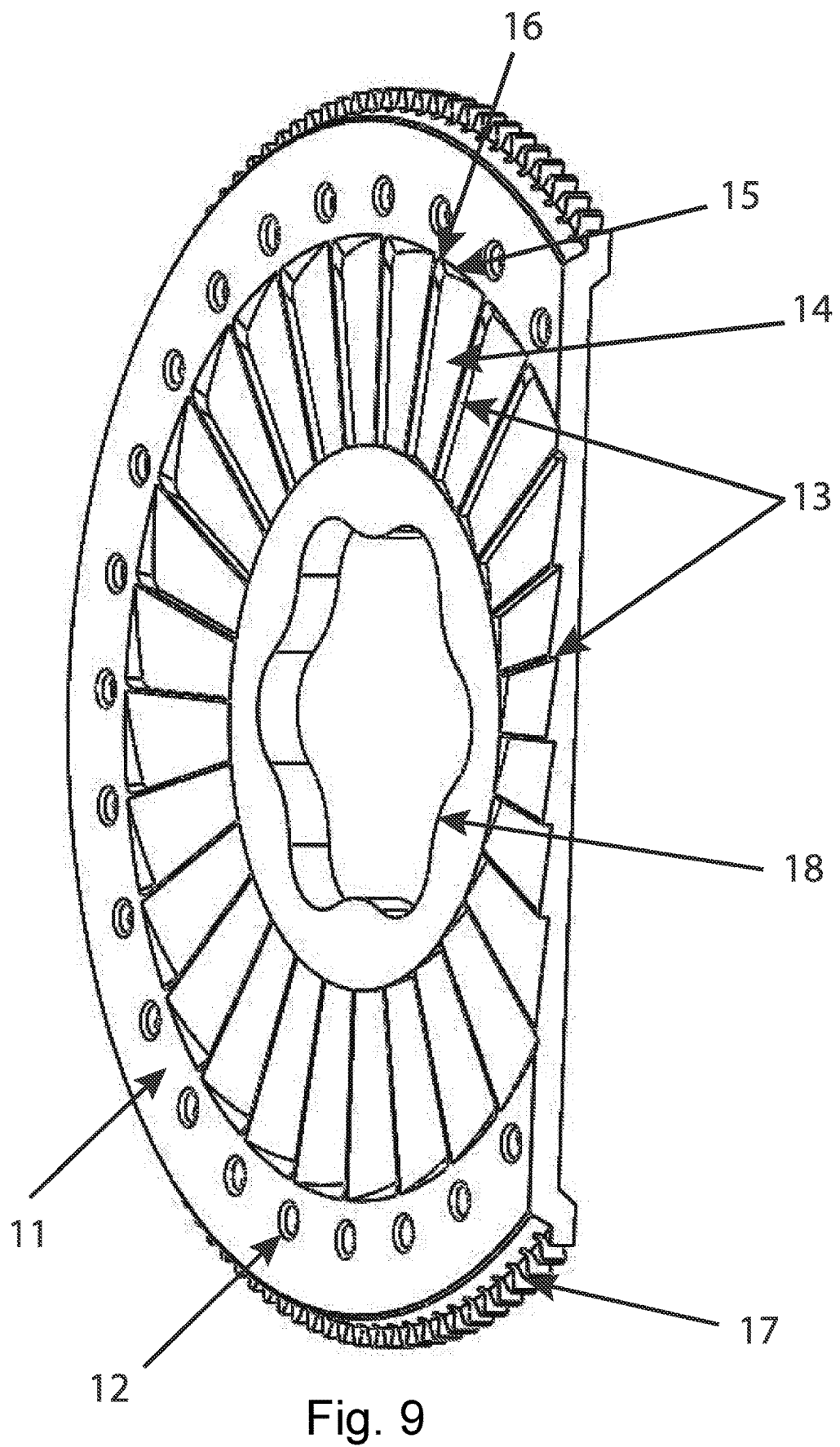
FIG. 9—Illustrates a cross-sectional view of the perforated disk of FIG. 8.

Reference is now made to FIGS. 8 and 9, which illustrate a disk (11) with holes (12), emphasizing the central disk seed stirrer.

The central disk stirrer is made up of a plurality of flaps (13) inside the plane that contains the holes (12) of the disk (11), and has a function in aiding the collection of the seeds through the holes (12). The central disk stirrer generates the seeds' movement in the same direction as the disk rotation, aiding in their collection through the holes (12) of the disk (11).

This allows the meter to run at high rotational speeds, allowing planting at a larger seed population per linear meter and/or higher planting speeds with good seed singulation in the holes, avoiding undesirable misses.

The profile of the disk's (11) central stirrer is designed to be efficient at stirring the seeds and at the same time not allowing (or reducing) the seeds to become trapped between the stirrer and the singulators in the disk region in which the singulation protrusions (20, 24) work.

In these figures, it can be observed that each flap (13) is formed by a straight plane perpendicular to the plane of the holes (12) of the disk (11), so that while the disk moves, it collides with the seeds, causing them to be stirred, minimizing misses. Each straight plane of the flaps (13) is connected to the other through an inclined plane (14), starting at the top of a flap (13) and ending at the bottom of the next one. As one gets closer to the holes region (12), this straight plane forms a rounded and/or beveled region (16) that connects to another beveled plane (15), forming a ramp that runs from the central stirrer region to the holes region (12), the ramp that brings in the seeds and directs them to the holes region in order for their collection therein.

Figure 10:
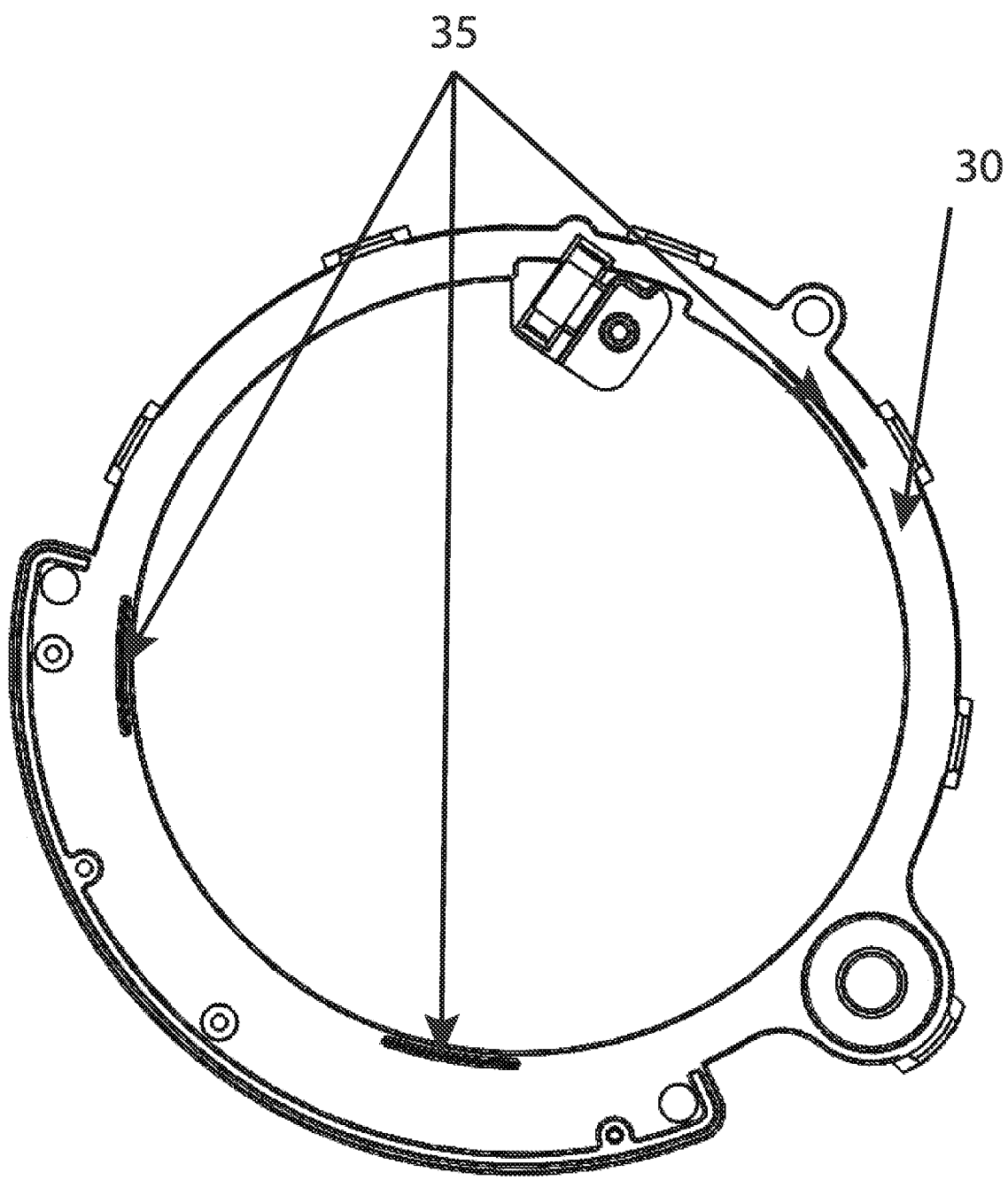
FIG. 10—Illustrates the lower ring of the seed selector assembly for the pneumatic meter of FIG. 2.
Figure 11:
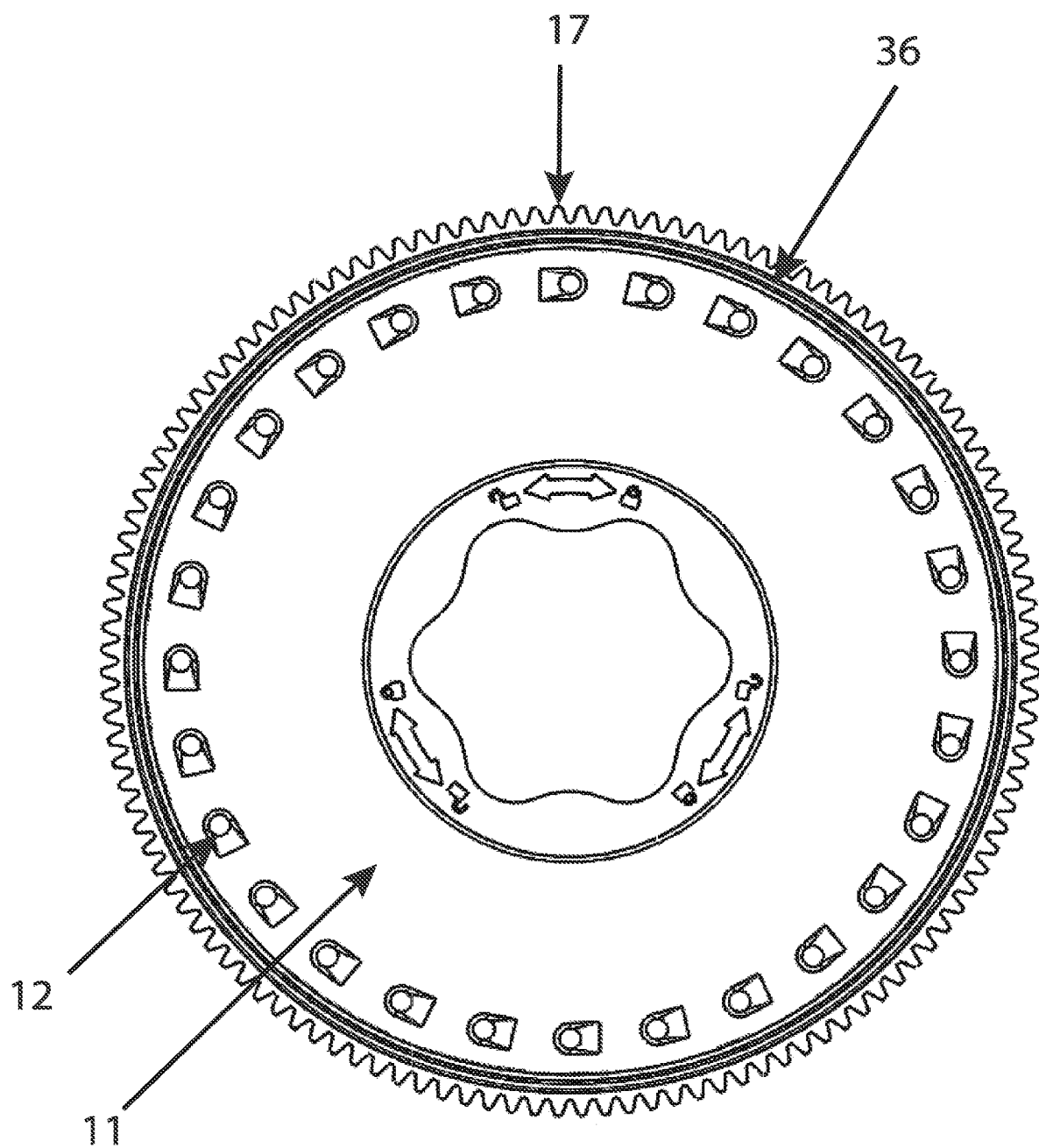
FIG. 11—Illustrates a rear view of the disk from the seed selector assembly for the pneumatic meter of FIG. 2.
Figure 12:
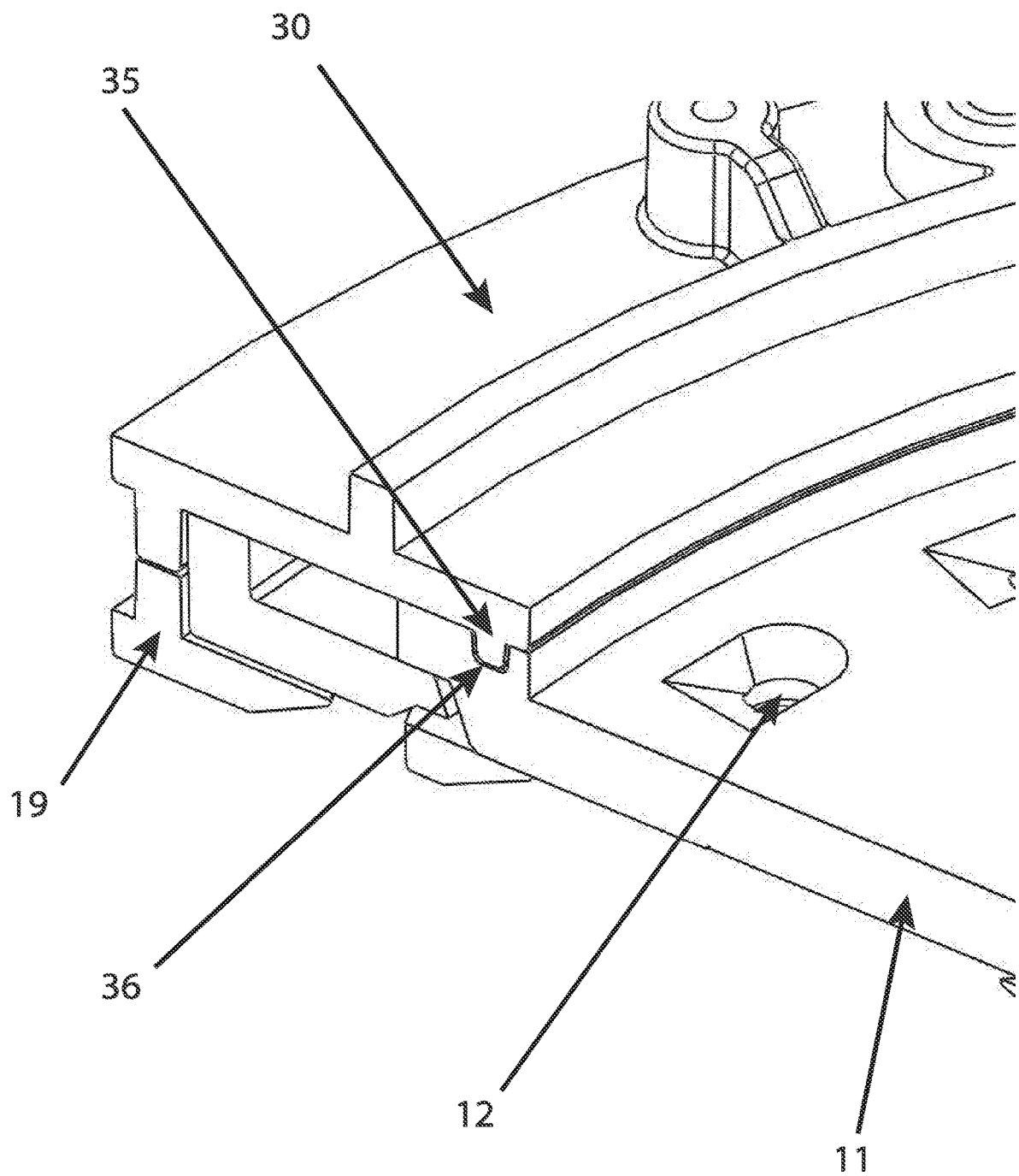
FIG. 12—Illustrates a detailed cross-sectional view of the seed selector assembly of FIG. 2.

FIGS. 10, 11 and 12 highlight the interaction between the tracks (35) of the rear ring (30) and the recess guide (36) on the disk (11). Such a track system inserted into a recess of the disk (12) may facilitate the positioning of the holes (12) of the disk relative to the singulation protrusions (20, 24), since they are arranged in the front ring (19), or fastened to the front ring (19) through the bridge (23), which is rigidly connected to the rear ring (30), which contain the tracks (35) that position the disk (11) in the correct working position. The track of the region opposite that of the singulation protrusions (20, 24) is less thick in order to prevent the disk (11) from locking when rotating.

Figure 13:
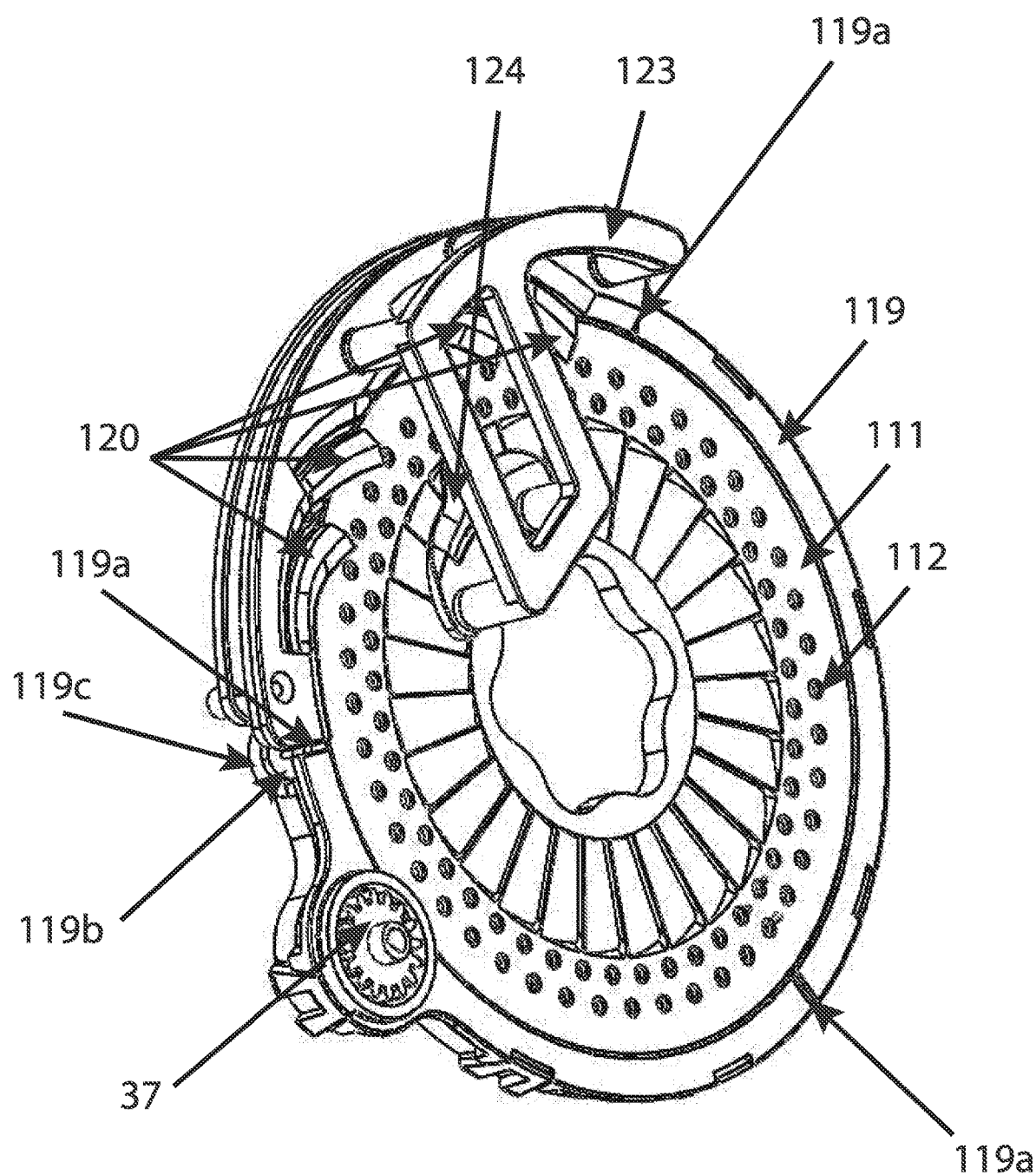
FIG. 13—Illustrates another disk embodiment from the seed selector assembly.

FIG. 13 illustrates an alternative embodiment for disk trapping rings, which have reliefs (119a) on the front ring (119) obtained through handle-shaped structures (119b), with corresponding reliefs (119c) on the back ring having the function of absorbing dimensional inaccuracies and movements of the disk (111).

The disk (111) is the representation of a different crop disk, where it has two hole rows (112) in order to serve crops with higher population per area. For this reason, the singulation protrusions (120, 124) will be positioned in such a way as to comply with this new configuration.

Figure 14:
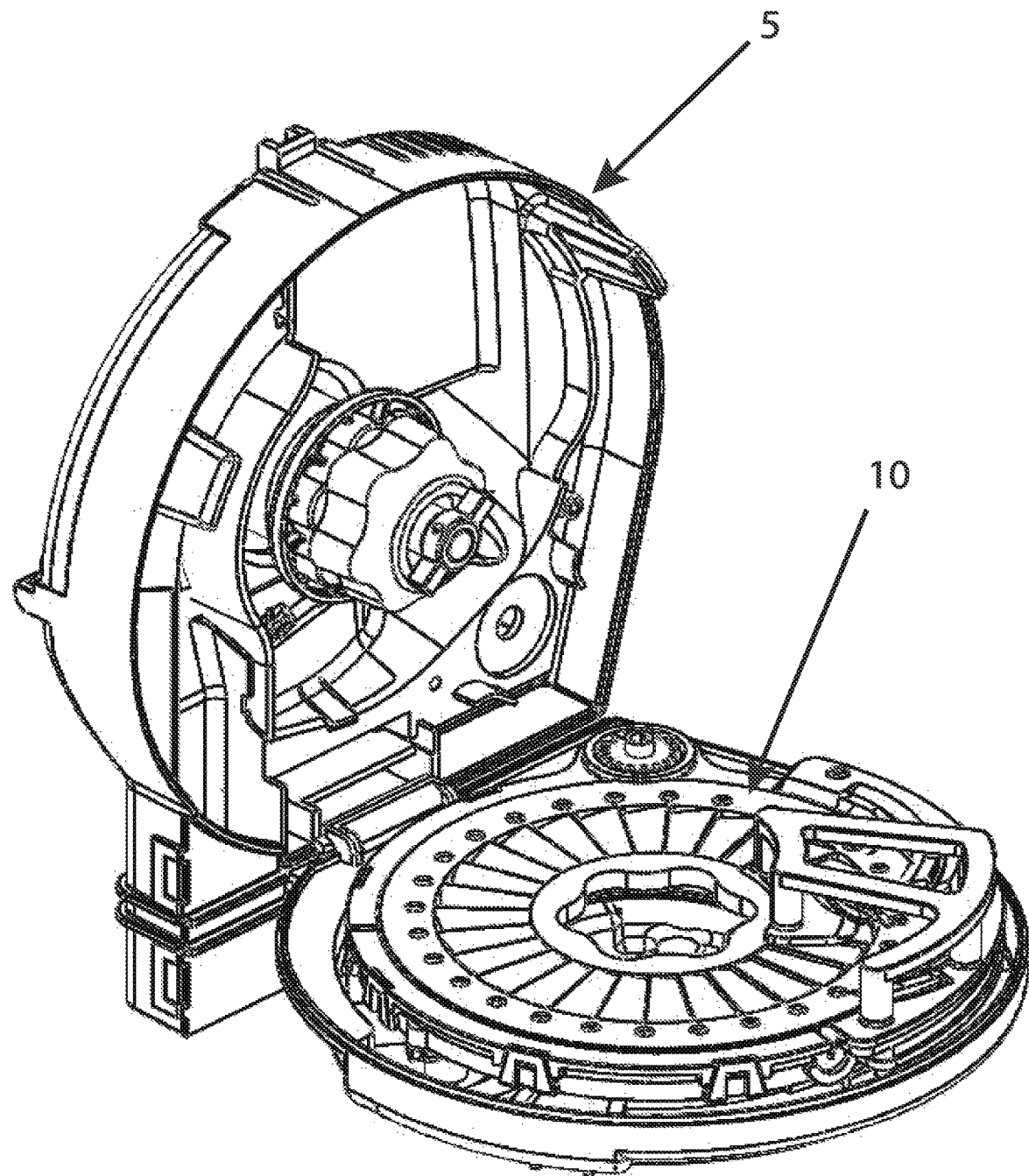
FIG. 14—Illustrates a possible meter assembly for a seed selector assembly for the pneumatic meter, the object of this disclosure.

FIG. 14 illustrates the seed selector assembly (10) of this disclosure in a housing of a prior art meter (5). When seeds of a different crop need to come out of the meter (5), it is sufficient to replace the seed selector assembly (10) with an assembly configured for the seeds of the different crop.

Figure 15:
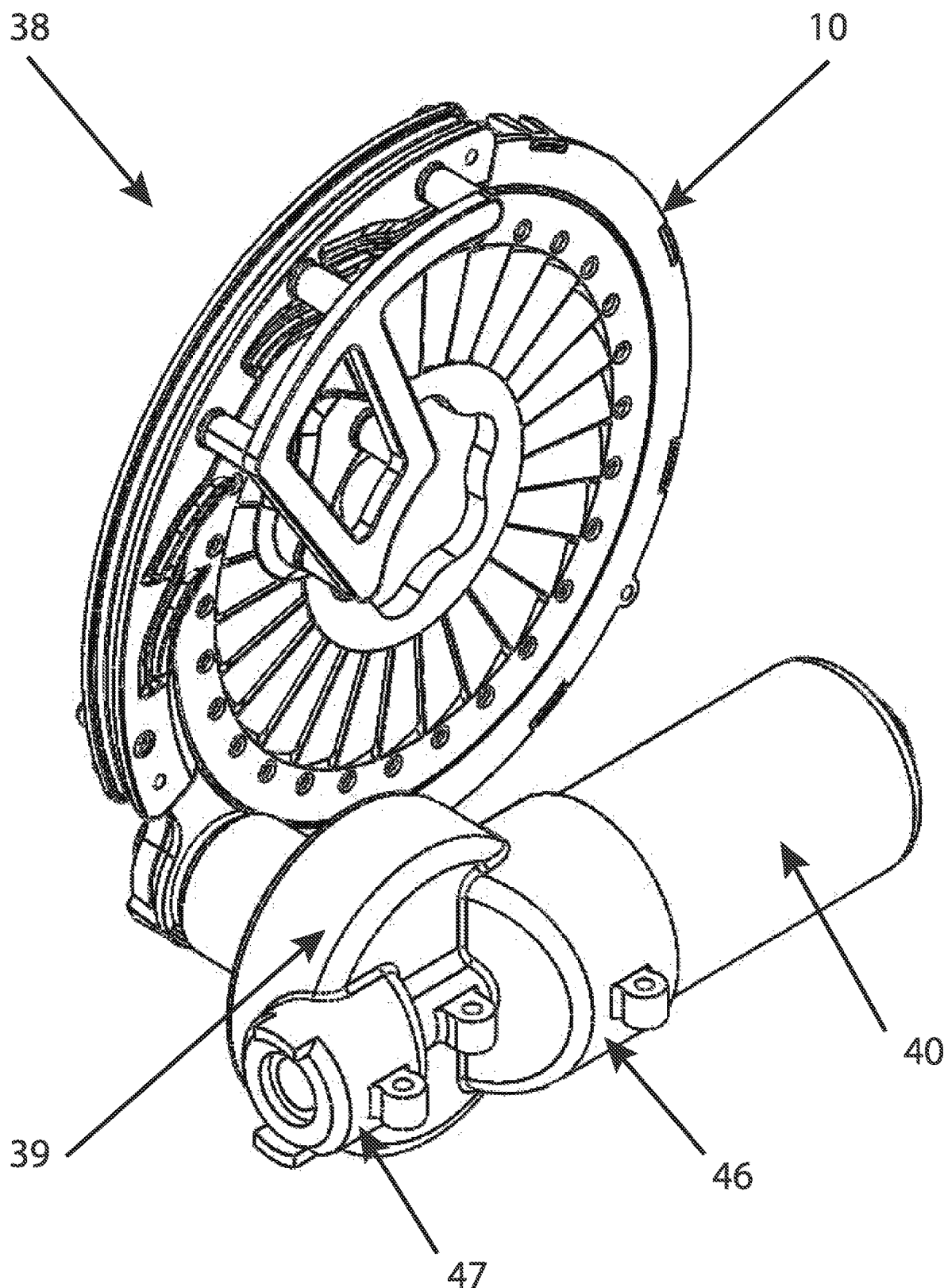
FIG. 15—Illustrates a view of the multi-functional coupler seed selector assembly coupled with an electric motor.
Figure 16:
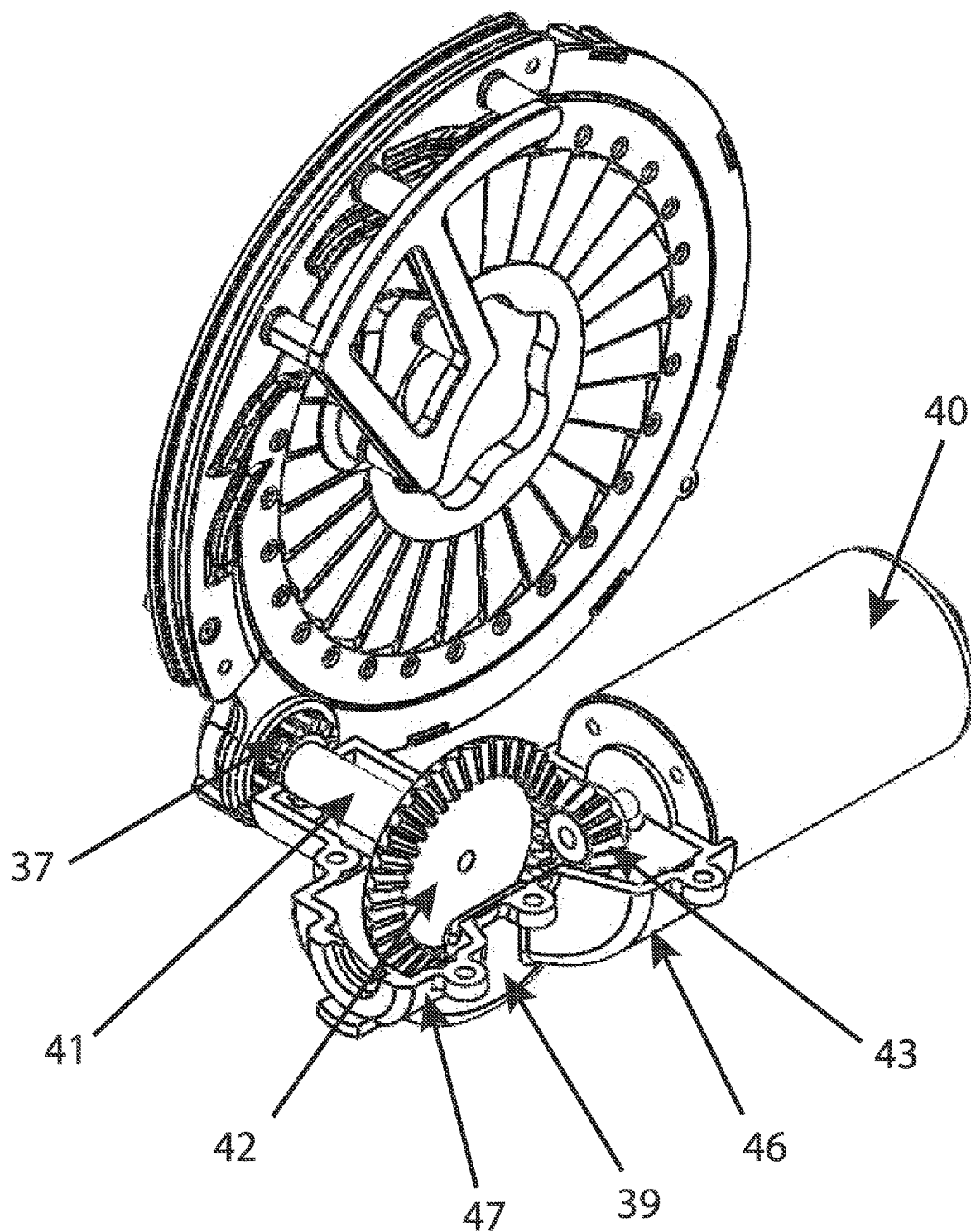
FIG. 16—Illustrates a view of the multi-functional coupler seed selector assembly coupled with an electric motor, with the coupling in cross-section.

FIGS. 15 and 16 illustrate the seed selector assembly (10) in the embodiment in which a multi-functional coupler (39) is configured for coupling movement of an electric motor (40) with the disk (11), in which a multi-functional coupler (39) has been developed to perform the motor or driven interface (46, 47) between the disk (11) and other devices. Referring also to FIG. 9, for example, in this embodiment, the coupler (39) is coupled with the disk (11) by means of the gear profile (17), but alternative constructions can be proposed for this coupling to be carried out through the center (18) of the disk (11). In this embodiment, the movement of the electric motor (40) is transmitted through a motor pinion (43) to the crown (42), and to the coupling pinion (37) through the shaft (41). Finally, the coupling pinion (37) transmits the movement to the disk (11) through the gear profile (17). The multi-functional coupler (39) may reduce the rotational speed of the motor (40) to match the rotation and torque of the motor (40) to work with the disk (11).

Figure 17:
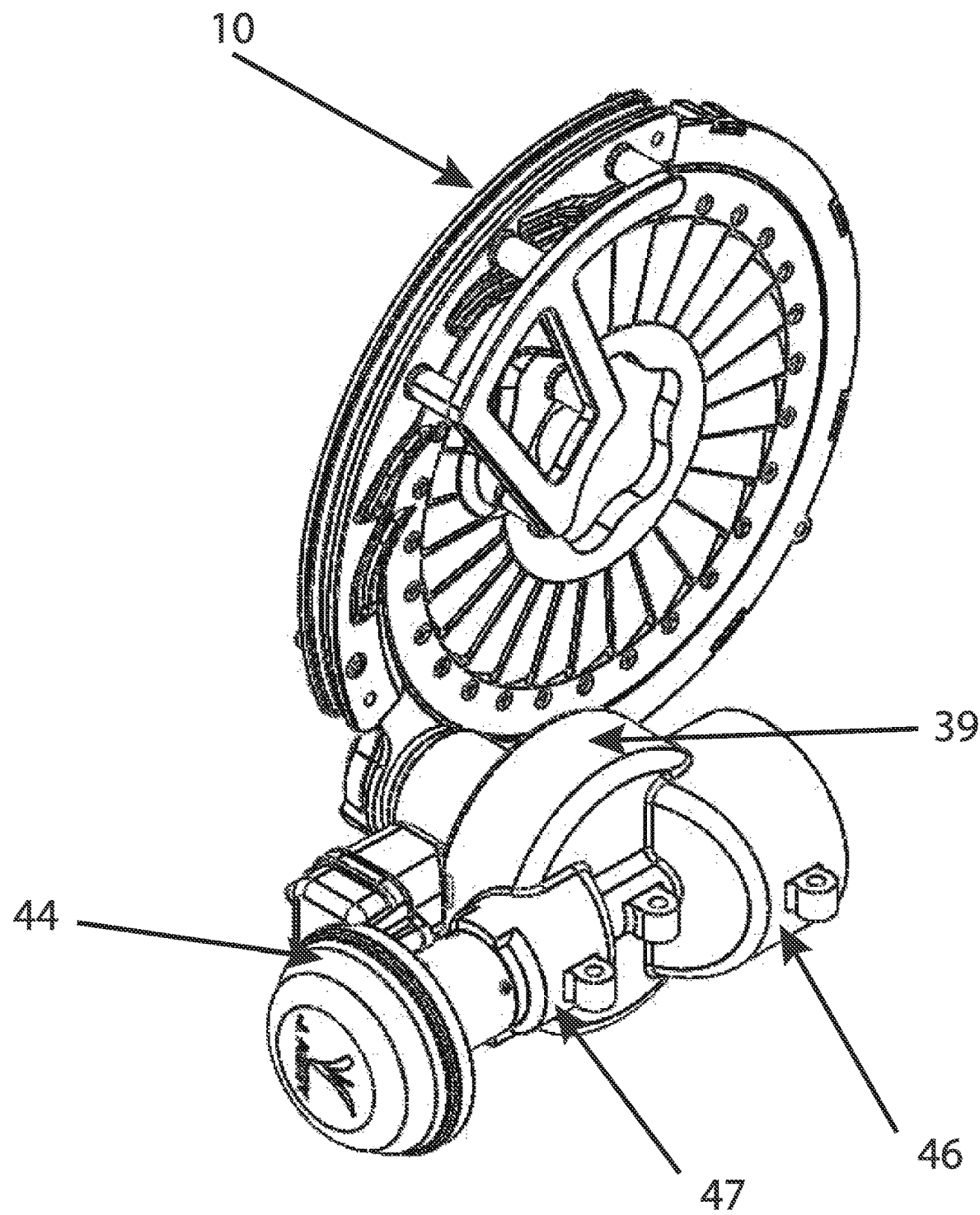
FIG. 17—Illustrates a view of the multi-functional coupler seed selector assembly coupled with an electric generator.

FIG. 17 illustrates the seed selector assembly (10) in an embodiment in which multi-functional coupler (39) is performing the coupling of movement of the disk (11) with an energy generator (44) in order to power sensors and/or actuators located in the seed meter and its vicinity.

Figure 18:
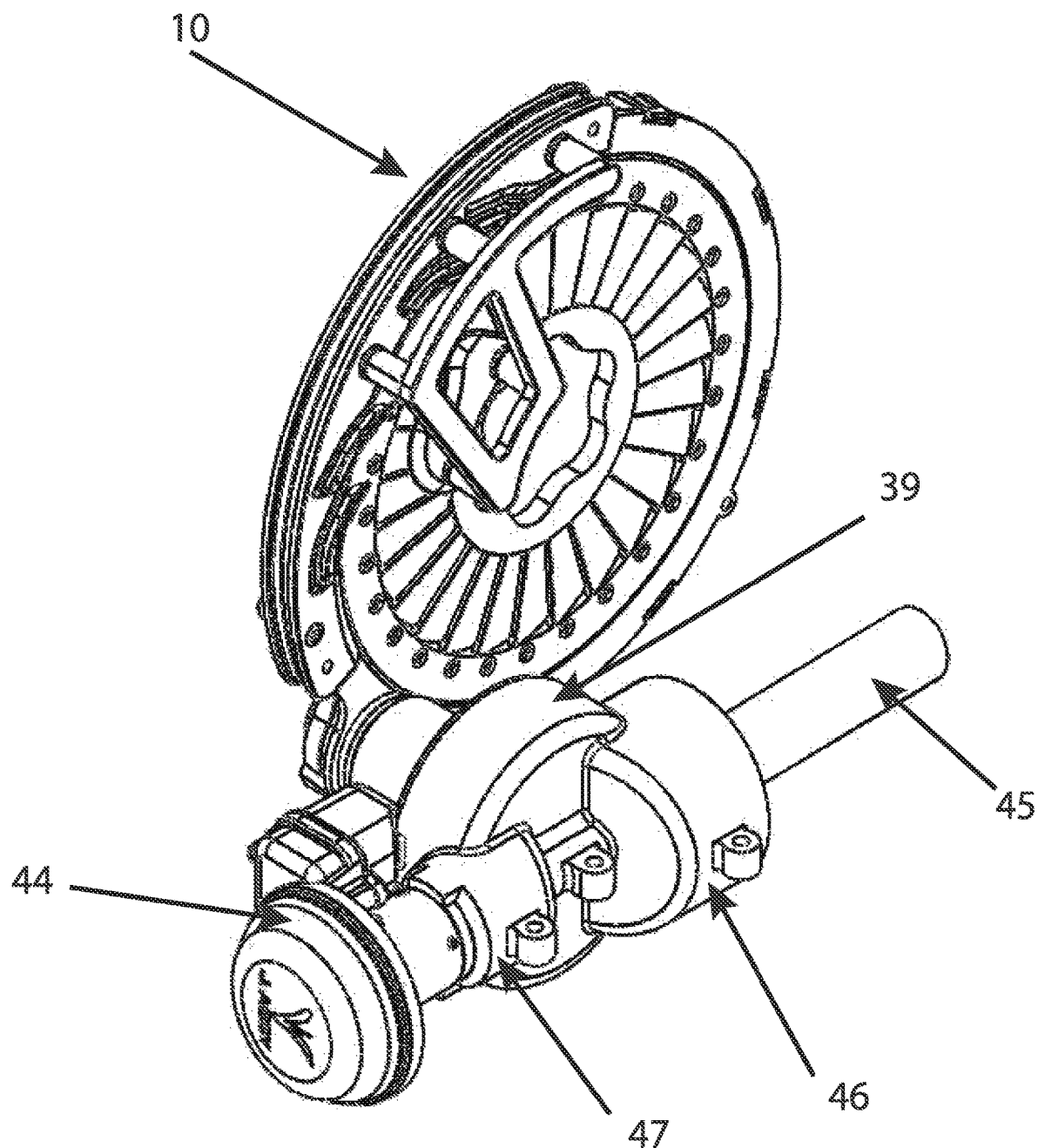
FIG. 18—Illustrates a view of the multi-functional coupler seed selector assembly coupled with an electric generator and a flexible cable.

FIG. 18 illustrates the seed selector assembly (10) in an embodiment in which multi-functional coupler (39) is configured for coupling movement of the disk (11) and the energy generator (44), a flexible cable (45) transmitting movement in order to carry out the rotation of the disk (11) and the energy generator (44).

The multi-functional coupler seed selector assembly (10) of this disclosure may reduce the need for adjusting the seed singulation protrusions (20, 24) and may facilitate the exchange of internal components in preparation of the meter for starting with the planting of a new crop.

Additionally, the multi-functional coupler seed selector assembly of this disclosure eliminates the need for adjusting the seed singulator, since it is precisely designed and provided in the same device as the disk that will be used for each type of crop to be dosed by the meter. The device disclosed herein may include the rotating disk (11) with a plurality of holes (12) for collecting and transporting seeds, the seed singulators, and the debris ejector, all gathered together in a single assembly.

This disclosure may provide an improved seed singulation level due to the fact that the disk (11) is trapped between the front ring (19) and the rear ring (30) being rotated and inserted into the tracks (35) of the rear ring (30), which may be rigidly connected to the upper ring that contains the singulation protrusions (20), and due to the singulation protrusions (20, 24) oblique advance over the disk at an angle (alpha) relative to the plane of the disk. Therefore, they work with a preload on the disk plane, reducing or eliminating possible gaps between them.

It will be readily understood by those skilled in the art that modifications of the invention may be made without departing from the concepts set forth in the previous description. Such modifications are considered as included within the scope of this disclosure. Accordingly, the particular embodiments described in detail above are merely illustrative and not limiting with respect to the invention's scope, to which the full extent of the claims alone and any equivalents thereof must be given.

What is claimed is:

1. A seed selector assembly for a pneumatic meter, comprising:
   a rotating disk with a plurality of holes placed radially, the disk being rotatable about a rotational axis;
   a seed singulator comprising a front support element and a rear support element; and
   a track system comprising a protrusion and a recess guide, wherein the protrusion protrudes and the recess guide recesses in a direction substantially parallel to the rotational axis of the disk, wherein the seed singulator is coupled to and is configured to be supported in a housing of the pneumatic meter by the disk via the track system, wherein a portion of the disk is positioned between the front support element and the rear support element forming a single device, wherein the seed singulator is configured to axially and radially move with the disk when the seed selector assembly moves within the housing of the pneumatic meter, wherein the housing of the pneumatic meter comprises a back side element and a front side element.

2. The seed selector assembly of claim 1, wherein the seed singulator comprises at least one singulation protrusion.

3. The seed selector assembly of claim 1, wherein the front support element comprises a front ring and the rear support element comprises a rear ring that is connected to the front ring.

4. The seed selector assembly of claim 3, wherein the front ring and the rear ring are provided with reliefs, each relief being placed in a flexible structure, the reliefs being configured to absorb movement of the disk.

5. A pneumatic meter comprising:
   a housing comprising a back side element and a front side element;
   a seed selector assembly, the seed selector assembly comprising:
      a rotating disk with a plurality of holes placed radially, the disk being rotatable about a rotational axis;
      a seed singulator; and
      a track system comprising a protrusion and a complementary recess guide, wherein the protrusion protrudes and the recess guide recesses in a direction substantially parallel to the rotational axis of the disk, wherein the seed singulator is coupled to and is supported in the housing of the pneumatic meter by the disk via the track system forming a single device, wherein the seed singulator is configured to axially and radially move with the disk when the seed selector assembly moves within the housing of the pneumatic meter.

6. A planter for sowing crops, comprising:
   a plurality of row units, each row unit including a pneumatic meter, the pneumatic meter comprising:
      a housing, the housing comprising a back side element and a front side element; and
      a seed selector assembly, the seed selector assembly comprising:
         a rotating disk with a plurality of holes placed radially;
         a seed singulator, the seed singulator comprising a front support element and a rear support element; and
         a debris ejector, wherein the debris ejector is positioned and configured to penetrate at least a portion of the holes of the disk, the debris ejector coupled to and supported by at least one of the front support element or the rear support element, wherein the seed singulator and the debris ejector are coupled to the disk and are supported in the housing of the pneumatic meter by the disk by positioning a portion of the disk between the front support element and the rear support element, wherein the disk, front support element, and rear support element form a single device, wherein the seed singulator and the debris ejector are configured to axially and radially move with the disk when the seed selector assembly moves within the housing of the pneumatic meter.

7. The seed selector assembly of claim 1, wherein the seed singulator comprises four upper singulation protrusions positioned on a radially outer side of the disk and one single inner singulation protrusion positioned on a radially inner side of the disk.

8. The seed selector assembly of claim 1, wherein the front support element and the rear support element extend along an entire peripheral edge of the disk.

9. A seed selector assembly for a pneumatic meter, comprising:
   a rotating disk with a plurality of holes placed radially;
   a debris ejector comprising a front support element and a rear support element, wherein the debris ejector penetrates at least a portion of the holes in the disk; and
   a track system comprising a protrusion and a recess guide, wherein the protrusion protrudes and the recess guide recesses in a direction substantially parallel to the rotational axis of the disk, wherein the debris ejector is coupled to the disk and is configured to be supported in a housing of the pneumatic meter by the disk via the track system, wherein a portion of the disk is positioned between the front support element and the rear support element forming a single device, wherein the debris ejector is configured to axially and radially move with the disk when the seed selector assembly moves within the housing of the pneumatic meter, wherein the housing of the pneumatic meter comprises a back side element and a front side element.

10. A pneumatic meter comprising:
    a housing comprising a front side element and a back side element;
    a seed selector assembly, the seed selector assembly comprising:
       a rotating disk with a plurality of holes placed radially;
       a seed singulator; and
       a debris ejector, wherein the debris ejector penetrates at least a portion of the holes of the disk, wherein the seed singulator and the debris ejector are coupled to the disk and are supported in the housing by the disk, forming a single device, wherein the seed singulator and the debris ejector are configured to axially and radially move with the disk when the seed selector assembly moves within the housing of the pneumatic meter.

11. A pneumatic meter comprising:
a housing comprising a back side element and a front side element;
a seed selector assembly, the seed selector assembly comprising:
  a rotating disk with a plurality of holes placed radially, wherein the disk is configured to rotate about a rotational axis;
  a debris ejector positioned to penetrate at least a portion of the holes in the disk; and
  a track system comprising a protrusion and a recess guide, wherein the protrusion protrudes and the recess guide recesses in a direction substantially parallel to the rotational axis of the disk, wherein the debris ejector is coupled to and is supported in the housing by the disk via the track system, forming a single device, wherein the debris ejector is configured to axially and radially move with the disk when the seed selector assembly moves within the housing.

12. The seed selector assembly of claim 1, wherein the disk comprises the protrusion and the singulator comprises the recess guide.

13. The seed selector assembly of claim 1, wherein the disk comprises the recess guide and the singulator comprises the protrusion.

14. The seed selector assembly of claim 13, wherein the disk comprises the protrusion and the singulator comprises the recess guide.

15. The seed selector assembly of claim 13, wherein the disk comprises the recess guide and the singulator comprises the protrusion.

16. The seed selector assembly of claim 9, wherein the disk comprises the protrusion and the singulator comprises the recess guide.

17. The seed selector assembly of claim 9, wherein the disk comprises the recess guide and the singulator comprises the protrusion.

18. The seed selector assembly of claim 11, wherein the disk comprises the protrusion and the singulator comprises the recess guide.

19. The seed selector assembly of claim 11, wherein the disk comprises the recess guide and the singulator comprises the protrusion.

\* \* \* \* \*